March 5, 1968  R. E. JACKSON ET AL  3,371,543
ENGINE POWER TAKEOFF DRIVE
Filed Oct. 21, 1966  4 Sheets-Sheet 1

INVENTORS
ROBERT E. JACKSON,
EVAN S. PRICHARD
BY MAHONEY, HALBERT &
HORNBAKER
ATTORNEYS

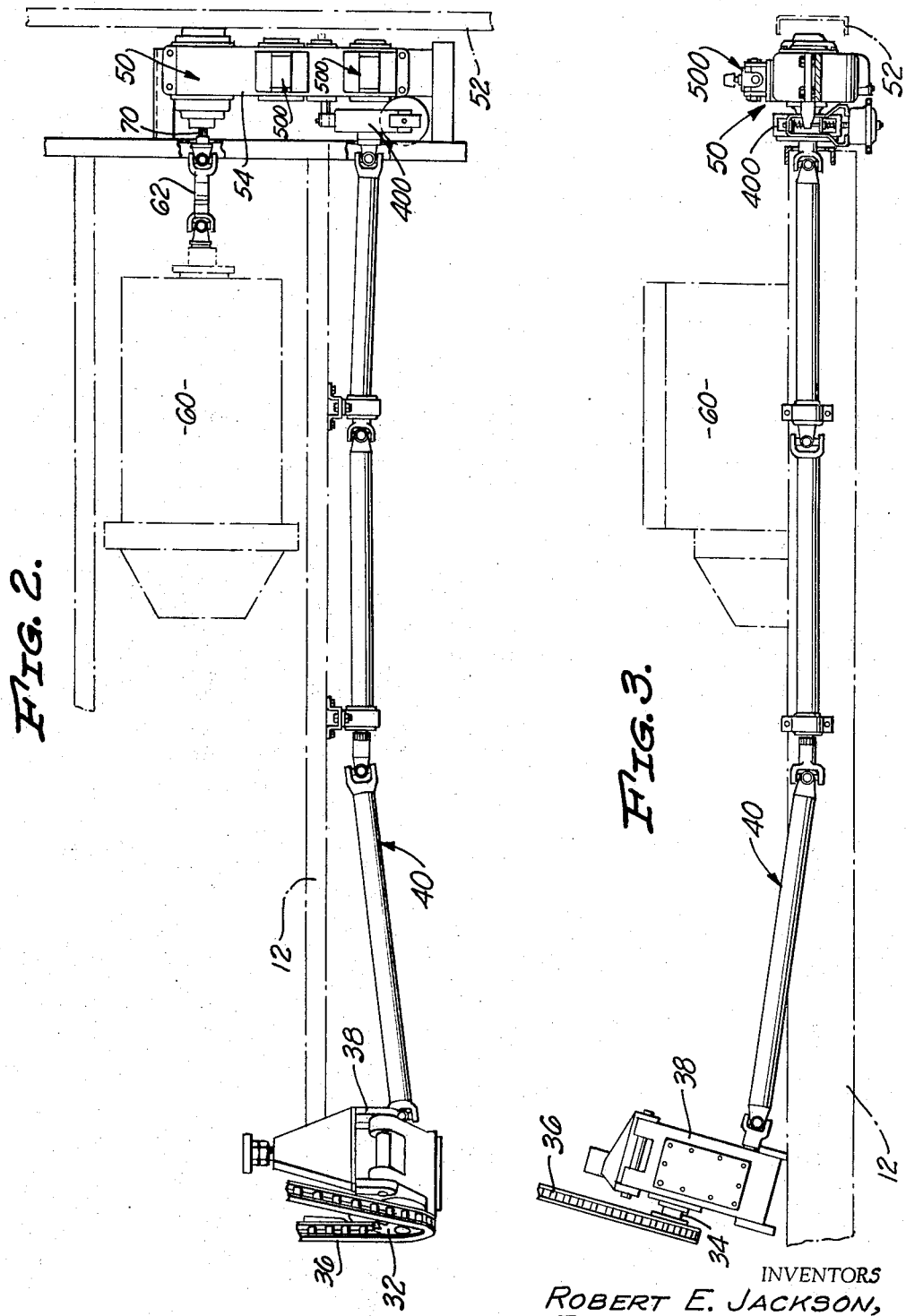

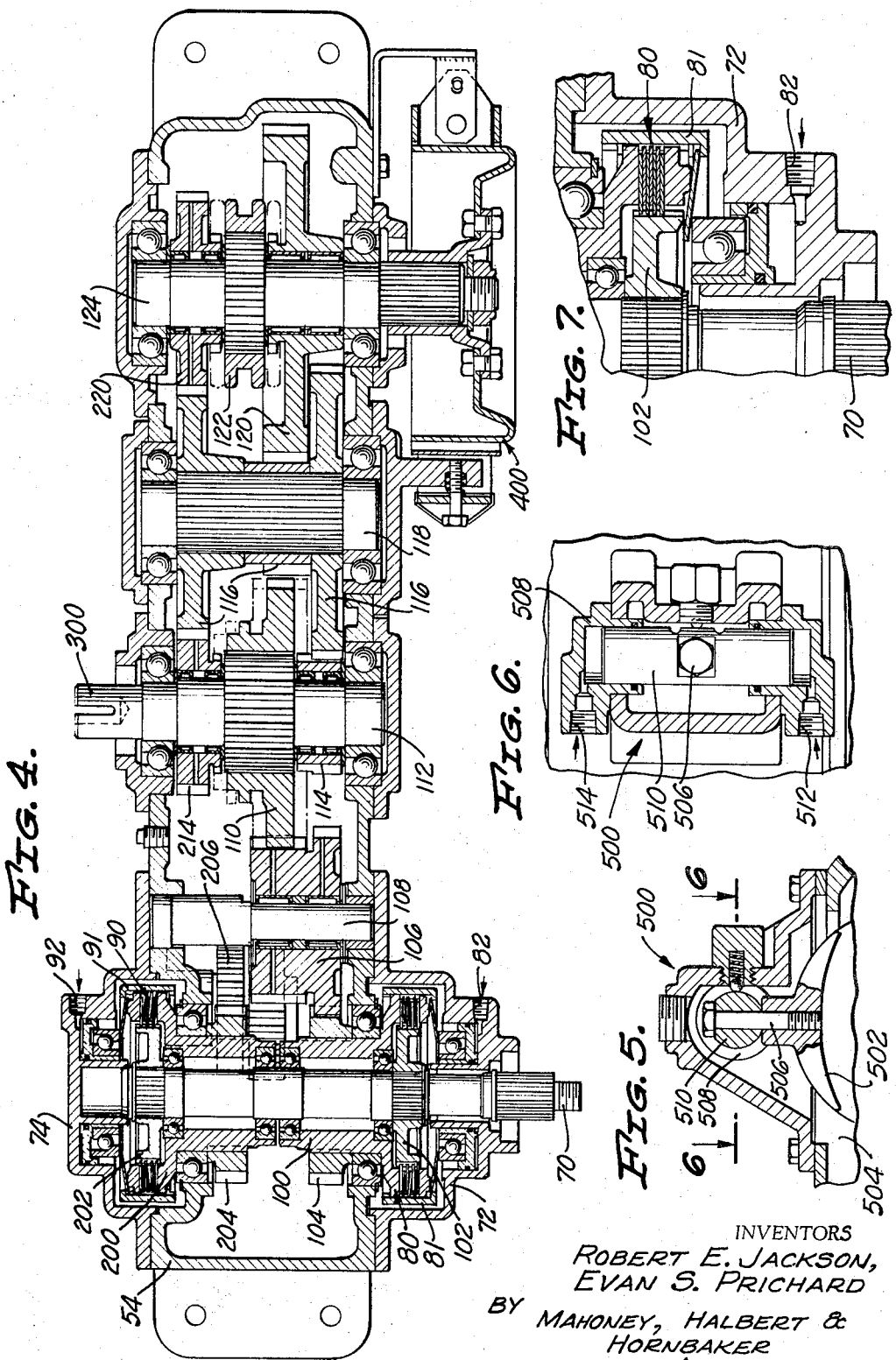

March 5, 1968  R. E. JACKSON ET AL  3,371,543
ENGINE POWER TAKEOFF DRIVE
Filed Oct. 21, 1966  4 Sheets-Sheet 4
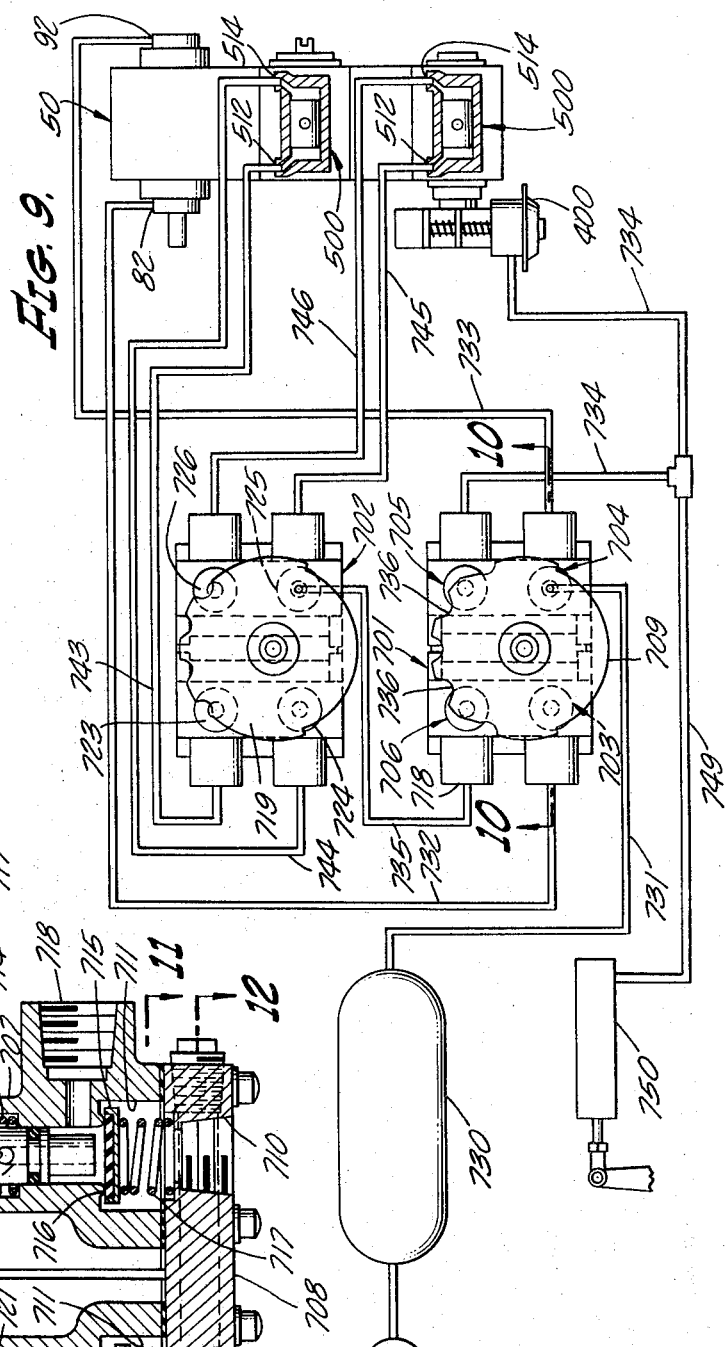
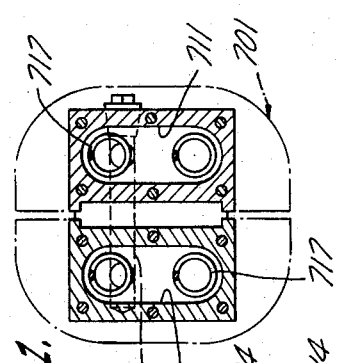
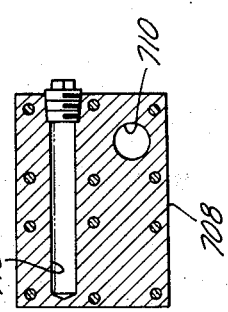
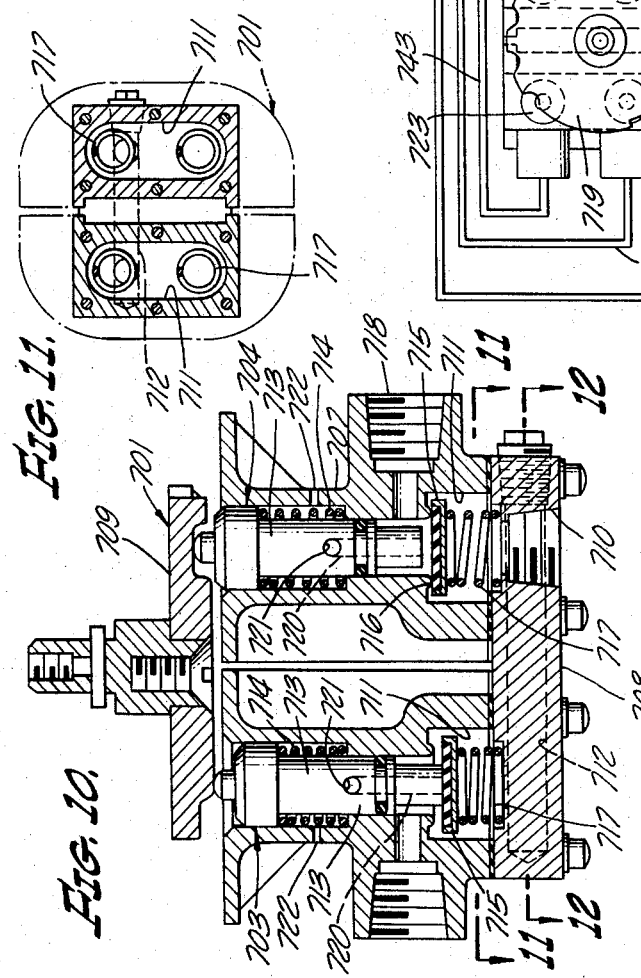
INVENTORS.
ROBERT E. JACKSON
EVAN S. PRICHARD
BY
Lyon Lyon
ATTORNEYS

United States Patent Office 3,371,543
Patented Mar. 5, 1968

3,371,543
ENGINE POWER TAKEOFF DRIVE
Robert E. Jackson, 1210 Sussex Lane, and Evan S. Prichard, 1212 Essex Lane, both of Newport Beach, Calif. 92660
Continuation-in-part of application Ser. No. 391,712, Aug. 24, 1964. This application Oct. 21, 1966, Ser. No. 596,372
14 Claims. (Cl. 74—15.4)

ABSTRACT OF THE DISCLOSURE

A power takeoff transfer-transmission for mounting on the front of a vehicle and being driven from the front of the vehicle engine, where an internal gear train serves both to accomplish multiple speed changes and to displace the drive axis laterally from in front of the engine to a rearwardly extending drive shaft along one side of the vehicle. The apparatus includes pneumatically operated clutches and gear shifting means for remote engagement and control of the direction and speed of the power output drive to the laterally positioned drive shaft.

---

This is a continuation-in-part of our copending application entitled, Engine Power Take-Off Drive, Ser. No. 391,712, filed Aug. 24, 1964, now abandoned.

This invention relates to an engine power takeoff drive. More particularly, it relates to a power drive accessibly mounted on the front of a transit mixer vehicle for powering a rotatable aggregate mixing drum, with power takeoff from the vehicle's engine or, in unusual situations, conveniently from a supplemental power source remote from the vehicle, when required.

The basic functions of a transit mixer are to continuously mix an aggregate mix in a rotatable truck-mounted drum during transit, the mix being accomplished by the rotation in one direction of helical blades mounted within the drum, and to discharge the aggregate mix at a job site by reversing the direction of rotation of the drum and, hence, the blades, to force the mix out of the elevated open end of the drum.

Heretofore, the drum of a transit mixer has generally been rotated in either mix or discharge direction by supplementary power means mounted on the truck chassis, but more recently it has been found advantageous to power the drum rotation by power takeoff from the truck engine. Means employed for such power takeoff, however, have to provide for both selective engagement and varied speed differentials between the speed of the engine and the speed of drum rotation. These variable speed differentials are necessary because it is highly desirable to rotate the drum within predetermined speeds dependent on the constitution of the particular aggregate mix contained in the drum, so as to accomplish thorough mix during the mixing operation and a consistent flow during discharge and yet operation of the vehicle requires a variety of engine speeds. In transit mixers in use prior to the present invention, this constancy of rotation speed has been sought to be accomplished by complicated engine power takeoff means, often disposed along the truck chassis so as to be rather inaccessible for maintenance, repair and control. Other engine power takeoffs have employed drive means connecting to a conventional clutch and gear box at the drum thereby resulting in such drive means being driven at all times that the truck engine is running, even during starting the engine, which is obviously undesirable.

Further, the distribution of weight on a transit mixer truck is always a problem due to the heavy loads involved and, in part, the legal requirements as to axle and wheel loading. As a result, it is desirable to locate the necessary vehicle weight and components as far forward as possible.

It is, therefore, an object of the present invention to provide simplified but highly efficient engine power takeoff drive means which will rotate a transit mixer drum at various predetermined speeds relative to engine speed.

It is another object of the invention to include clutch means in a single housing with power takeoff and speed change drive means.

It is still another object of the invention to provide a power transmission and transfer device in which the output shaft is spaced substantially away from the input shaft.

Another object of this invention is to provide a unique power takeoff device for the front of a transit mix vehicle which efficiently accomplishes all of the following functions; remote actuation and selection of multiple speed changes, selective engagement and disengagement of the drive, braking of drum rotation, and lateral transfer of the drive axis for convenient rearward transmission to drive the mixing drum.

It is yet another object of the invention to provide fluid power means, rather than mechanical means, for conveniently operating power transmission clutches from dual locations.

It is still another object of the invention to provide power transmission means which are readily accessible for maintenance, repair and control.

It is a further object of the invention to provide such means which are easy to install.

A further object of this invention is to provide an engine power takeoff combining clutch and speed change mechanisms with axis transfer for location at the front of the vehicle for minimizing the weight of the device and providing the most desirable weight distribution to maximize the vehicle payload. A still further object is to provide such a device which is conveniently disengaged from the truck engine when mixer drum drive is not required.

It is yet another object of the invention to provide supplemental power takeoff means with such means for powering drum rotation when truck engine power is lost as, for example, when the truck engine stalls.

With these and other objects in view, the invention consists of the construction, arrangement and combination of the various elements of the device whereby the objects contemplated are attained, as hereinafter set forth, pointed out in the appended claims, and illustrated in the accompanying drawings, in which:

FIGURE 2 is an enlarged, fragmentary plan view of the power takeoff drive assembly of the present invention;

FIGURE 3 is a side elevational view of the assembly shown in FIGURE 2;

FIGURE 4 is an enlarged, longitudinal, horizontal sectional view of the power transfer-transmission assembly of the present invention;

FIGURE 5 is a fragmentary, vertical cross-sectional view of the gear shift assembly;

FIGURE 6 is a view taken on line 6—6 of FIGURE 5;

FIGURE 7 is a fragmentary view of a portion of the discharge gear train clutch in engaged position.

FIGURE 9 is a diagrammatic representation of another embodiment of the fluid controls of the present invention for more versatile control.

FIGURE 10 is a sectional elevation of one of the two valve assemblies employed in fluid control system of FIGURE 9 taken substantially on the line 10—10 and showing two of the four separate valves contained in each valve assembly.

FIGURE 11 is a reduced sectional plan view of the valve assembly taken substantially on line 11—11 of FIGURE 10 and showing the inlet passageways.

FIGURE 12 is a reduced sectional plan view of the valve assembly taken substantially on line 12—12 of FIGURE 10 and showing the inlet chambers to the four valves.

Figure 1:
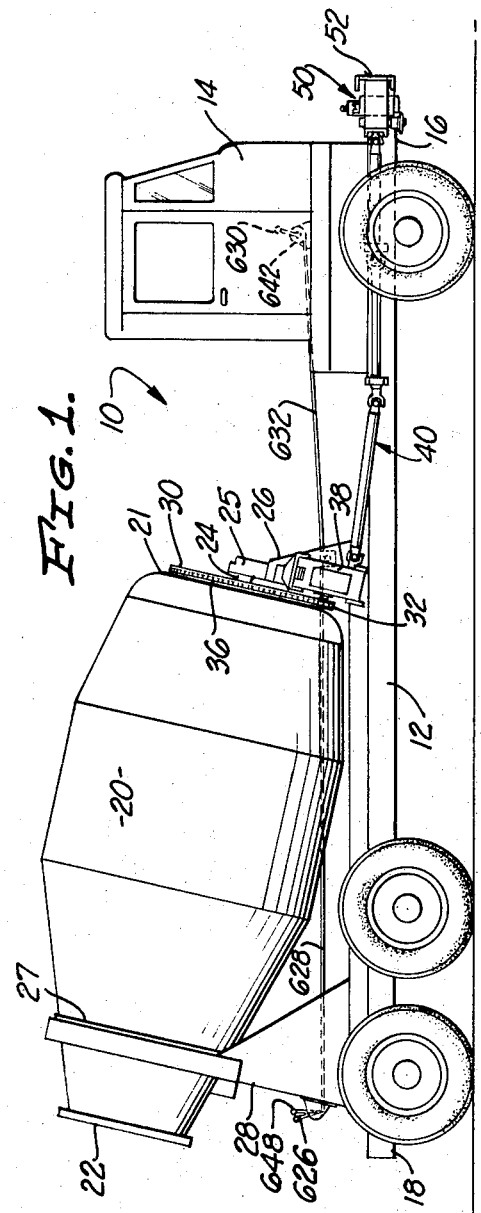
FIGURE 1 is a side elevational view of a truck transit mixer having the engine power takeoff transfer-transmission drive of the present invention installed thereon.

In FIGURE 1 of the drawings there is shown a rear-discharge transit mixer truck, generally designated 10, which has a truck body frame 12 on which an operator's cab 14 is mounted forwardly. The body frame 12 has a forward end 16 and a rear end 18.

A mixer drum 20 having a closed end 21 and an open loading and discharge end 22 is rotatably mounted on the body frame 12 rearwardly of the cab 14, the drum 20 being rotatably supported on the body frame 12 forwardly by a shaft 24 extending axially from substantially the center of the closed end 21 of the drum 20 into a journal box 25 mounted on a pedestal 26, in turn mounted on the body frame 12, the drum 20 being rotatably supported on the body frame 12 rearwardly by a circumferential ring 27 which rides on rollers (not shown) mounted on a stanchion 28, in turn mounted on the body frame 12 adjacent the rear end 18 of the body frame 12.

It will be understood that for the purposes of illustration the drum 20 is shown mounted on the body frame 12 for rearward loading and discharge, but that the present invention may be applied to a forward loading and discharge drum as well.

Rotational movement of the drum 20 may be accomplished by means of a sprocket 30 mounted on the drum 20 and a sprocket 32 mounted on a shaft 34, with a roller chain 36 mounted on the sprockets 30 and 32. The shaft 34 protrudes from a gear reducer 38 mounted on the pillow block 26. The gear reducer 38 effects solely a given speed change which cannot be varied or disengaged.

The gear reducer 38 is powered by a drive line 40 which extends rearwardly along one side of the truck 10 from a power transfer transmission generally designated 50, which, as illustrated in the drawings, may be mounted on the forward end 16 of the body frame 12, preferably between the body frame 12 and a bumper 52, or may otherwise be mounted. The transmission 50 is enclosed in a housing 54. The dispositions of the drive line 40 and the transmission 50 are shown in detail in FIGURES 2 and 3 of the drawings. These figures also show a truck engine 60 mounted forwardly on the truck 10, and FIGURE 2 shows a short drive shaft 62 extending forwardly from the engine 60 to the transmission 50. This transmission 50 is particularly useful as a front power takeoff but it will readily appear to those skilled in the art that if the transmission 50 is mounted on the body frame 12 rearwardly of the engine 60, the drive into the transmission 50 will, of course, extend rearwardly from the engine 60.

The power transfer transmission 50 is illustrated in substantial detail in FIGURES 4-7 of the drawings, and has two multiple disc wet-type clutches running in oil to control directional rotation of the drum 20. It has a four-speed gear train which permits selection of the proper gear speed for various operating conditions, and it has a drum brake, later described in detail, which is mounted on the output shaft of the transmission 50.

Control is provided by a fluid system having valves which control the starting and stopping of the rotation of the drum 20, the direction of the rotation of the drum 20, the engagement and disengagement of the brake, and the selection and shifting through four speed gear ranges. Two alternate though similar air control systems are diagrammatically illustrated in FIGURES 8 and 9 of the drawings.

As shown in FIGURE 2 of the drawings, an input shaft 70 to the transmission 50 is connected to the drive shaft 62. Referring to FIGURE 4 of the drawings, the input shaft 70 is shown disposed within the transmission 50 and the transmission 50 is shown in disengaged position. The shaft 70 extends transversely through a rear housing bearing cap 72 and into a front housing bearing cap 74. The cap 72 contains a multiple disc wet-type discharge clutch 80 disposed in a clutch drum 81 so as to be engageable with the shaft 70 by the introduction of fluid under pressure through a port 82 in the cap 72, the function of the clutch 80 being to engage the shaft 70 when it is desired to rotate the drum 20 in a discharge direction (which is normally counter-clockwise as viewed from the rear of the truck). Similarly, the cap 74 contains a multiple disc wet-type charge clutch 90 disposed in a clutch drum 91 so as to be engageable with the shaft 70 by the introduction of fluid through a port 92 in the cap 74, the function of the clutch 90 being to engage the shaft 70 when it is desired to rotate the drum 20 in a charge or mixing direction (which is normally clockwise as viewed from the rear of the truck).

By the introduction of fluid under pressure into the cap 72, discharge clutch drum 81 and a driven hub 100 on which it is mounted engage a drive hub 102. Input drive gear 104 is mounted on the driven hub 100, and power is thus transmitted from the input shaft 70 to the drive gear 104. The drive gear 104 engages an idler cluster gear 106 mounted on a fixed idler shaft 108 for driving in the "discharge" direction.

Conversely, for driving in a "mix" direction, by the introduction of fluid under pressure into cap 74, the charge clutch drum 91 and a driven hub 200 on which it is mounted engage a drive hub 202. Input drive gear 204 is mounted on the driven hub 200, and power is thus transmitted from the input shaft 70 to the drive gear 204. The drive gear 204 engages a countershaft idler cluster gear 206 mounted on a fixed idler shaft (not shown, but disposed in back of and between the shafts 108 and 70 in the illustration of FIGURE 4), to drive the gear train in the charge direction, opposite to that described above concerning the discharge direction. The countershaft idler cluster gear 206 engages cluster gear 106 which is no longer driven by gear 104 under this condition.

The idler cluster gear 106 is then engaged by a sliding shifter gear 110 which is mounted on and drives a shaft 112. A low speed primary gear 114 and a high speed primary gear 214 are both mounted on the shaft 112. Sliding shifter gear 110 is engageable with either the low or high speed primary gears 114 or 214. The low speed primary gear 114 is engageable with the lowest of three intermediate gears 116. The lowest intermediate gear 116 then drives a shaft 118 at a given speed ratio. The shaft 118 in turn drives both the center and uppermost of the intermediate gears 116, which in turn engage driven secondary gears 120 and 220, respectively. Shifter collar 122 mounted on an output shaft 124 can then selectively engage gear 120 or 220 to drive output shaft 124 at two different speeds which, thus driven, is connected to the drive line 40, with a brake hereinafter described interposed therebetween. Sliding shifter gear 110 is engageable with the high speed primary gear 214 for a different speed ratio since the high speed primary gear 214 is engageable with the uppermost of the three intermediate gears 116. The uppermost intermediate gear then drives the shaft 118 at the different speed than when connected through primary gear 114. The shaft 118 in turn drives the center of the intermediate gears 116. Both the center and uppermost intermediate gears 116 engage and drive secondary gears 120 and 220, respectively. Shifter collar 122 can then selectively engage the gears 120 or 220 to power the output shaft 124, as hereinabove described.

It will be readily apparent to those skilled in the art that the selection of combinations of the low speed primary gear 114, the high speed primary gear 214, the low speed secondary gear 120, and the high speed secondary gear 220 will provide four different drive speeds by means of gear shift assemblies hereinafter described and the drive can be in either direction by reason of the clutches.

The shaft 112 may be constructed, as illustrated in FIGURE 4 of the drawings, so as to provide a protruding end 300 extending forwardly through the housing 54. In the event of a power failure in the shaft 70, as when the engine 60 stalls, the protruding end 300 of the shaft 112 may be coupled to the protruding end of a similar shaft of a second vehicle, similarly equipped, or to an auxiliary source of power, such as a stationary engine or motor, and power input may thus be obtained to drive the shaft 112, with power transmission and output occurring as above described.

Figure 8:
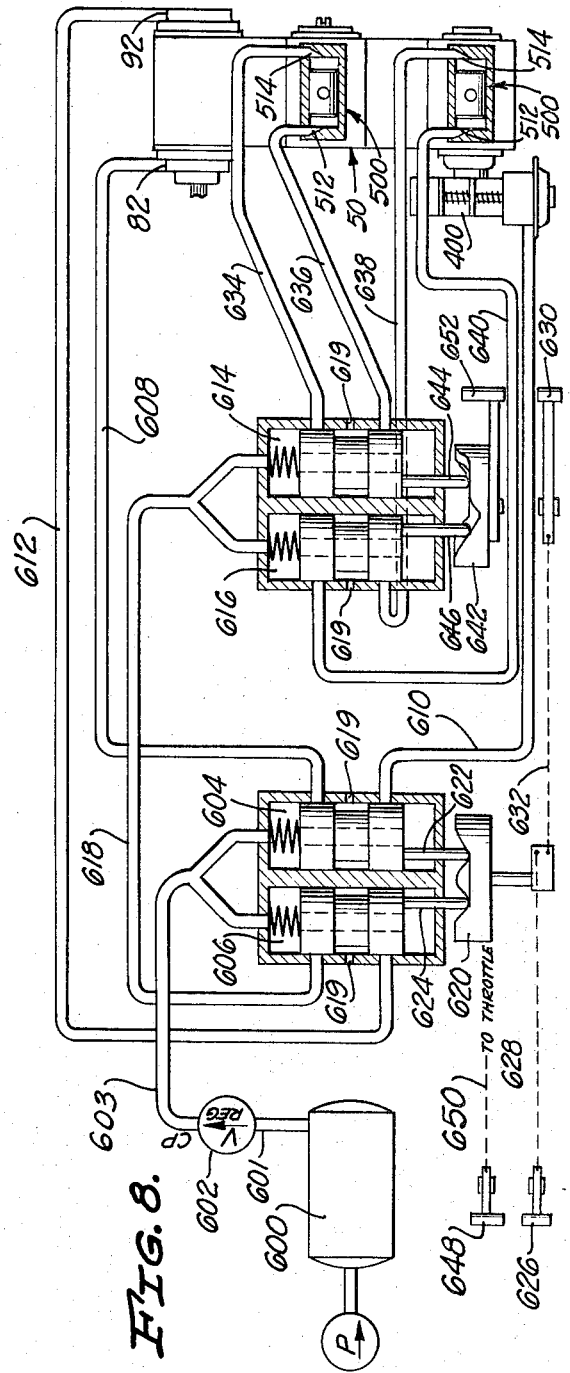
FIGURE 8 is a diagrammatic representation of one embodiment of the fluid controls of the present invention.

Interposed between the output shaft 124 and the drive line 40 is a brake 400, which is a standard automotive brake sequenced so that when the clutches 80 or 90 are disengaged, braking will be applied to the output shaft 124, braking power being applied by the fluid control systems shown in FIGURES 8 or 9 of the drawings. By having the brake 400 applied while clutches 80 or 90 are disengaged, the mixing drum 20 is prevented from freely rotating which normally is undesirable.

Referring to FIGURES 5 and 6 of the drawings, there is illustrated a gear shift assembly 500 which has a fork 502 slidably disposed in a casing 504. The fork 502 is mounted on a stud 506, the free end of which is disposed in a fluid cylinder 508 and is perpendicularly mounted on a rod 510 slidably disposed in the cylinder 508. A fluid port 512 is provided on one end of the cylinder 508, and a fluid port 514 is provided on the other end of the cylinder 508, the disposition of the various parts of the gear shift assembly 500 being such that introduction of fluid under pressure into either of the ports 512 or 514 will shift the rod 510, and hence, the fork 502, in the opposite directions.

One of the gear shift assemblies 500 is mounted over the shaft 112, with the fork 502 of that assembly 500 being disposed so as to engage the groove in the sliding shifter gear 110 and selectively bring it into engagement with either the low speed primary gear 114 or the high speed primary gear 214, as desired. Another of the gear shift assemblies 500 is mounted over the output shaft 124, with the fork 502 of that assembly 500 being similarly disposed so as to engage the groove in the shifter collar 122 and selectively bring it into engagement with either the low speed secondary gear 120 or the high speed secondary gear 220, as desired. It will thus be seen that the four speeds hereinabove mentioned may be readily, selectively attained.

One form of the fluid control system of the present invention is illustrated in FIGURE 8 of the drawings. A source of fluid under pressure, designated P, and a fluid pressure reservoir 600, are provided. A fluid pressure line 601 leads from the reservoir 600 to a regulator valve 602. A controlled pressure line 603 leads from the valve 602 to two separately operable four-way spring biased slide valves 604 and 606. Each of the valves 604 and 606 has a pressure inlet, a hollow spool shaped slide piston operated by a plunger (622 and 624, respectively), a pair of selectively pressurized outlets, a biasing spring, and an exhaust port 619. One outlet of valve 604 is connected through line 608 to discharge clutch port 82 and the other outlet is connected through line 610 to brake 400. One outlet of valve 606 is connected through line 612 to mix clutch port 92 and the other outlet is connected through line 618 to two additional four-way slide valves 614 and 616 which are the speed selector valves. Thus by appropriate actuation of valves 604 and 606 pressure may be applied to clutch 80, clutch 90, brake 400 or valves 614 and 616.

The valves 604 and 606 are selectively operated by a cam 620 which acts upon plungers 622 and 624, respectively, and cam 620 is in turn operated either by a directional control handle 626 located rearwardly on the truck body frame 12 (as on the stanchion 28 as shown in FIGURE 1) and connected to the cam 620 by a cable 628, or by a directional control handle 630, which may be conveniently disposed in the cab 15, and connected to the cam 620 by a cable 632.

The speed selector valves 614 and 616 are similar to the valves 604 and 606 in that they are four-way, spring-biased slide valves. The two outlets of the speed selector valve 614 are connected respectively to the port 514 of one of the gear shift assemblies 500 by means of a pressure line 634, and to the other port 512 by means of a pressure line 636. Similarly, the two outlets of the speed selector valve 616 are connected respectively to the port 514 of the other of the gear shift assemblies 500 by means of a pressure line 638, and to the other port 512 thereof by means of a pressure line 640.

As in the case of the valves 604 and 606, the speed selector valves 614 and 616 are selectively operated by a cam 642 which acts upon plungers 644 and 646, respectively. A speed control handle 648 is preferably located adjacent handle 626 at the rear of the vehicle and a cable 650 is connected to the handle 648 and to the engine throttle. A speed control handle 652 is preferably located adjacent handle 630 in the cab of the vehicle, said handle 652 being either directly connected to the cam 642, as illustrated, or being connected thereto by cable.

It will be understood that by reason of cam 620 the operation of valves 604 and 606 is interdependent and that the configuration of cam 620 controls the sequence and combinations of operations. Specifically, valves 604 and 606 are never simultaneously in positions for pressurizing both the discharge clutch 80 and mix clutch 90 since this would be attempting to drive in both directions simultaneously. Further, when the spool of valve 606 is in a downward position (as viewed in FIGURE 8) to supply pressure to the speed selector valves 614 and 616, the spool of valve 604 is an upward position to pressurize brake 400 and both line 608 and line 612 exhaust through ports 619 whereby shifting is accomplished with the drum stopped. In other positions of the cam 620 either of clutches 80 or 90 will be pressurized while neither the brake 400 or valves 614 and 616 are pressurized, or the brake 400 may be pressurized without supplying pressure to either the clutches 80 or 90 or the valves 614 and 616.

It will also be understood that cam 642 is of a configuration whereby the four speed selections are accomplished by four different positions of the cam wherein valve 614 pressurizes either line 634 or line 636 and valve 616 pressurizes either line 638 or line 640. Once the shifting has been accomplished by applying the pressure to the appropriate sides of the pistons in shifting assemblies 500, the shifter collar gear 110 and shifter collar 122 will remain in the shifted position and the pressure can be allowed to decay.

Referring now to the control system of FIGURE 9, the transmission 50 and its components remain the same including the ports 82 and 92 to the discharge and mix clutches, respectively, the brake 400, and the two shifting assemblies 500 with their ports 512 and 514. The control valves employed in the system of FIGURE 9 differ from those in the system of FIGURE 8 and are shown in more detail in FIGURES 10, 11 and 12. There is provided a drive control valve assembly, generally designated 701, and a speed selection valve assembly, generally designated 702, rather than the aforedescribed valves 604, 606, 614 and 616. The valve assemblies 701 and 702 are identical and therefore only valve assembly 701 is shown in FIGURES 10, 11 and 12 and will be described in detail. Valve assembly 701 is comprised of four separately operable valves 703, 704, 705 and 706 contained in a split housing 707 with an end plate 708 and operated in common by a cam 709. End plate 708 has a fluid pressure inlet 710 communicating with one of the inlet chambers 711 provided each half of the split housing 707 and a passageway 712 communicating the two chambers 711. Each of the valves 703, 704, 705 and 706 includes a plunger 713 mounted in a bore in the housing 707 and biased upwardly (as viewed in FIGURE 10) by spring 714 into continuous engagement with cam 709. A valve disc 715 having a resilient sealing element confronts and is urged toward a valve seat 716 by a spring 717. The disc 715 is selectively moved to an open position by downward movement of plunger 713 to communicate pressure to the outlet port 718 of the valve. The plunger 713 is provided with a central bore 720 opening at its lower end facing disc 715 and communicating laterally through a port 721 in plunger 713 to an exhaust port 722 in the housing whereby when the end of plunger 713 is lifted from disc 715, as shown in the right hand valve in FIGURE 10, the outlet port 718 will be exhausted to atmosphere. When the end of plunger 713 engages disc 715 this exhaust passage is closed, as shown in the left hand valve in FIGURE 10. The configuration and position of cam 709 determines which of the valves 703, 704, 705 and 706 are in an open or closed-exhaust position. Similarly, a cam 719 on valve assembly 702 determines which of the four separately operable valves 723, 724, 725 and 726 thereof are open or closed-exhausted.

Considering now the operation of the system of FIGURE 9, air at a relative constant pressure is supplied from tank 730 through line 731 to the inlet 710 of valve assembly 701 to pressurize the inlets to valves 703, 704, 705 and 706. The outlets 718 of valves 703, 704, 705 and 706 are connected respectively through lines 732, 733, 734 and 735 to the discharge clutch port 82, the mix clutch port 92, the brake 400, and the inlet port 710 of valve assembly 702. Cam 709 is operated by a lever (not shown) and has five positions indexed by a detent means (not shown) engaging the five notches 736 in the cam periphery. In one extreme rotated position of cam 709 only valve 703 is open whereby the line 732 to discharge clutch 80 is pressurized to drive the drum 20 in the discharge direction and the three other valves 704, 705 and 706 are in an "exhaust" position for depressurizing lines 733, 734 and 735. In the other extreme position of cam 709 only valve 704 is open to pressurize line 733 and mix clutch 90 for driving the drum 20 in a "mixing" direction. Immediately adjacent the two extreme positions of the cam 709 are two identical positions where only the valve 705 is open to pressurize line 734 to actuate the brake 400 whereby each time the cam 709 is moved from an extreme position where the drum is driven, the drum is immediately braked to a stop. The central or fifth position of cam 709 between the two braking positions causes both valve 705 and valve 706 to be open to pressurize lines 734 and 735 whereby the brake 400 is still applied and valve assembly 702 is now pressurized for speed selection (shifting). At this point preferably the cam 719 on valve 702 has previously been moved to the desired speed selection (one of four positions whereby the supplied air pressure through line 735 causes immediate shifting. In valve assembly 702 the outlets 718 of valves 723, 724, 725 and 726 are connected respectively through lines 743, 744, 745 and 746 to the two shift assemblies 500 with lines 743 and 744 connected to ports 512 and 514 of one and lines 745 and 746 connected to ports 512 and 514 of the other, respectively. Thus the four selections of speeds are achieved by the cam serving to open two valves (and "exhaust" the other two) in one of the following combinations: first, 723 and 725; second, 723 and 726; third, 724 and 725; and fourth, 724 and 726. After the speed has been selected by cam 719, the cam 709 is moved to either extreme position for "mixing" or "discharge" rotation of the drum. This provides the desired range of speeds for accomplishing all the desired functions of drum 20.

The line 734 to brake 400 is provided with a branch line 749 to a throttle retard cylinder 750 for preventing excessive engine racing when the drum rotation load is removed.

Although the invention has been herein shown and described in what is conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

We claim:

1. An engine power takeoff drive for transmitting power from a vehicle-propelling engine to a rotatable mixer drum mounted on the rear of the vehicle which vehicle includes a truck body frame with the engine mounted on the truck body frame and a drive shaft on the engine extending forwardly from the engine at substantially the longitudinal center of the truck body frame, comprising in combination; a housing mounted on the truck body frame; a power input shaft disposed within the housing and connected to the drive shaft; a fluid-pressure operated clutch means disposed within the housing and engageable with the input shaft, said clutch means including an idler gear means operatively adapted for causing rotation reverse from that of said input shaft, and said clutch means selectively operable for causing forward or reverse rotation; a multi-speed gear train physically disposed within the housing laterally of the clutch means and engageable with the clutch means; a power output shaft disposed within the housing laterally of the gear train and engageable with the gear train, the output shaft extending from the housing; and a drive line connected to the output shaft and extending rearwardly on the truck body frame for operable connection to and driving of the rotatable mixer drum.

2. An engine power takeoff drive as defined in claim 1, including fluid-pressure means for selectively operating the multi-speed gear train and said clutch means.

3. An engine power takeoff drive for a vehicle which includes a truck body frame with a vehicle-propelling engine mounted forwardly on the truck body frame and a drive shaft on the engine extending forwardly from the engine at substantially the longitudinal center of the truck body frame, comprising in combination; a housing mounted at the front end of the truck body frame; a power input shaft disposed within the housing and connected to the drive shaft in axial alignment therewith; a fluid-pressure operated clutch disposed within the housing; a driven hub mounted on the clutch; a drive hub mounted on the input shaft and engageable with the driven hub; a drive gear mounted on the input shaft; an idler shaft disposed in the housing laterally of the drive gear; an idler cluster gear mounted on the idler shaft and engaging the drive gear; a third shaft disposed in the housing laterally of the idler cluster gear; a low speed primary gear mounted on the third shaft; a high speed primary gear mounted on the third shaft; a sliding shifter gear mounted on the third shaft, the shifter gear engaging the idler cluster gear and selectively engageable with the low speed primary gear and the high speed primary gear; a fourth shaft disposed within the housing laterally of the third shaft; a series of three intermediate gears mounted on the fourth shaft, the low speed primary gear being engaged with one of the intermediate gears, the high speed primary gear being engaged with another of the intermediate gears, and said two intermediate gears being operatively connected with the third intermediate gear; a power output shaft disposed in the housing laterally of the fourth shaft and extending therefrom; a low speed secondary gear mounted on the output shaft and engaging one of the intermediate gears; a high speed secondary gear mounted on the output shaft and engaging another of the intermediate gears; a shifter collar mounted on and engaging the output shaft, said shifter collar being selectively engageable with the low speed secondary gear and the high speed secondary gear; and a fluid-pressure brake mounted on the output shaft.

4. An engine power takeoff drive as defined in claim 3, including: a second fluid-pressure operated clutch disposed within the housing; a second driven hub mounted on the second clutch; a second drive hub mounted on the input shaft and engageable with the second driven hub; a second drive gear mounted on the input shaft; a countershaft disposed in the housing adjacent the second drive gear; and a countershaft cluster gear mounted on the countershaft and engaging the second drive gear, the countershaft gear being engaged with the idler cluster gear to drive the remaining gear train and the output shaft in a direction oppoiste to the direction imparted to it by the first clutch.

5. An engine power takeoff drive as defined in claim 3 including fluid-pressure means for selectively engaging the low speed primary gear, the high speed primary gear, the low speed secondary gear, and the high speed secondary gear.

6. An engine power takeoff drive as defined in claim 5, wherein the fluid-pressure means comprises: a source of fluid under pressure; a fluid pressure reservoir; a fluid pressure line leading from the source of fluid under pressure to the reservoir; a first valve; a fluid pressure line leading from the reservoir to the first valve; a fluid pressure line leading from said first valve to second and third valves; a fluid pressure line leading from the second valve to a first gear shift assembly engageable with the sliding shifter gear so as to move the sliding shifter gear in one direction; a second fluid pressure line leading from the second valve to said first gear shift assembly so as to move said first gear shift assembly in the other direction; a fluid pressure line leading from the third valve to a second gear shift assembly engageable with the shifter collar so as to move the shifter collar in one direction; a second fluid pressure line leading from the third valve to said second gear shift assembly so as to move said second gear shift assembly in the other direction; and mechanical means for selectively operating the said valves.

7. In a vehicle engine power takeoff transfer-transmission for selective multi-speed drive from the front of the vehicle engine to a laterally disposed and rearwardly extending drive shaft, the combination of; a housing mounted in front of the vehicle engine, laterally spaced input and output shafts in said housing, said input shaft protruding rearwardly directly toward the front of the vehicle engine, means operably connecting said input shaft to the vehicle engine, a multi-speed gear train disposed within said housing physically and operatively between and connecting said input and output shafts for causing speed changes and lateral displacement of the drive axis from that of the engine to that of the drive shaft including an idler gear means within said housing and operatively adapted for selective actuation in said gear train between said input and output shafts for causing reverse direction drive of said output shaft, selectively operable clutch means within said housing connected with said input shaft both for selectively engaging and disengaging said input shaft with the gear train and for selectively connecting and disconnecting said idler gear means, said gear train having at least one shiftable gear means selectively operable for effecting different speed ratios between the input and output shafts, and remotely operable control means for selectively operating said clutch means and shiftable gear means.

8. The combination of claim 7 wherein said gear train includes at least one additional shaft which rotates under driven conditions of the output shaft of the device and which extends out of the housing for selective connection to an auxiliary power source.

9. In a vehicle engine front power takeoff transfer-transmission for selective multi-speed drive from the front of the vehicle engine to a laterally disposed and rearwardly extending drive shaft, the combination of; a housing mounted in front of the vehicle engine, laterally spaced input and output shafts in said housing, said input shaft protruding rearwardly directly toward the front of the vehicle engine, means operably connecting said input shaft to the vehicle engine, a multi-speed gear train disposed within said housing physically and operatively between and connecting said input and output shafts for causing speed changes and lateral displacement of the drive axis from that of the engine to that of the drive shaft including an idler gear means operatively adapted for selective connection to said input shaft for causing reverse direction drive of said output shaft, selectively operable clutch means connected with said input shaft both for selectively engaging and disengaging said input shaft with the gear train and for selectively connecting and disconnecting said idler gear means, control means for operating said clutch means, brake means on said output shaft being selectively operable by said control means, said gear train having at least one shiftable gear means for causing a speed change, and said shiftable gear means being selectively operable by said control means.

10. The device of claim 9 wherein said control means is comprised of fluid pressure operating means including valves for controlling the supply of fluid to said clutch means and brake means and shiftable gear means.

11. The device of claim 10 wherein said valves are operated by cam means for coordinating the actuation of said clutch, brake and shiftable gear means.

12. The device of claim 11 wherein said cam means operate said valves for applying said brake means and disengaging said clutch means during operation of said shiftable gear means.

13. The device of claim 11 wherein said valves are in two separate groups and said cam means include one cam for each group, one group of valves serving to actuate said clutch means and brake means and to control the supply of fluid to the other group, and the other group of valves actuating only said shiftable gear means.

14. In a transit mix truck engine power takeoff transfer-transmission for selective multi-speed drive of a rearwardly disposed mixing drum, the combination of; a drive shaft means extending along the outside of the truck frame from the front of the truck to the mixing drum, a directly connected drive means between said drive shaft means and the mixing drum for rotation of the mixing drum in response to any rotation of said drive shaft means, a housing having laterally spaced input and output shafts, said housing mounted on the front of said truck with said input shaft directly in front of the truck engine shaft, a shaft connecting the front of the truck engine shaft to the said input shaft, a multi-speed gear train disposed within said housing physically and operatively between and connecting said input and output shafts for causing speed changes and lateral displacement of the drive axis, from that of the engine to that of the drive shaft, said gear train having shafts lying in substantially a common plane with said input and output shafts for producing maximum lateral displacement of the drive, an idler gear means operatively adapted for selective connection between said input shaft and said gear train upon operatively disconnecting said input shaft from direct connection to said gear train for causing reverse direction drive of said output shaft, selectively operable means connected with said input shaft for selectively connecting and disconnecting said input shaft either directly with the gear train or indirectly with the gear train through said idler gear means, said gear train having at least one speed change means comprised of a shifting gear means selectively operable for effecting different speed ratios between the input and output shafts, and control means remotely operable for selectively actuating the said operable means connected with the input shaft and the said speed change means.

References Cited

UNITED STATES PATENTS

| | | | |
|---|---|---|---|
| 2,365,571 | 12/1944 | Lloyd | 74—335 |
| 2,867,126 | 1/1959 | Bolster | 74—360 |
| 3,073,580 | 1/1963 | Lendved | 259—177 |
| 3,080,767 | 3/1963 | Price | 74—360 |

ROBERT M. WALKER, *Primary Examiner.*

DONLEY J. STOCKING, *Examiner.*

L. H. GERIN, *Assistant Examiner.*